United States Patent [19]
Johnson et al.

[11] 4,241,271
[45] Dec. 23, 1980

[54] SOLID BRUSH CURRENT COLLECTION SYSTEM

[75] Inventors: John L. Johnson, Plum Borough; Lawrence E. Moberly, Churchill Borough, both of Pa.

[73] Assignee: Westinghouse Electric Corp., Pittsburgh, Pa.

[21] Appl. No.: 928,116

[22] Filed: Jul. 26, 1978

Related U.S. Application Data

[63] Continuation-in-part of Ser. No. 838,181, Sep. 30, 1977, abandoned.

[51] Int. Cl.³ .................... H02K 9/28; H01R 39/00
[52] U.S. Cl. ................................ 310/219; 310/227; 310/248; 428/408
[58] Field of Search .................... 428/408; 310/55, 56, 310/57, 219, 220, 221, 222, 223, 227, 232, 239, 241, 248, 249, 251, 252, 253

[56] References Cited
U.S. PATENT DOCUMENTS

| | | | |
|---|---|---|---|
| 1,492,931 | 5/1924 | Nobuhara | 310/227 |
| 1,719,407 | 7/1929 | Trudeau | 310/227 |
| 2,560,784 | 7/1951 | Sears | 310/227 |
| 3,673,447 | 6/1972 | Zumbach et al. | 310/227 |
| 3,826,942 | 7/1974 | Twarog, Jr. | 310/232 |

OTHER PUBLICATIONS

Pardee, "Moisture Dependance of Silver-Graphite Brushes in Air, Nitrogen, Helium and Carbon Dioxide", IEEE Transactions on Power Apparatus and Systems, vol. 86, #5, May 1967, pp. 616-625.

Savage et al., "Vapor Lubrication of Graphite Sliding Contacts", Journal of Applied Physics, vol. 27, #2, Feb. 1956, pp. 136-138.

*Primary Examiner*—William R. Dixon, Jr.
*Attorney, Agent, or Firm*—J. R. Campbell; Z. L. Dermer

[57] ABSTRACT

A solid brush current collecting system for dynamoelectric machines which selectively uses compatible materials in different applications for the moving and stationary contact members. Brushes of different compositions are disclosed and the current transfer and collecting members are operated in an inert gas atmosphere, such as carbon dioxide, having either water or organic additives, such as alcohols, hydrocarbons, ketones, and the like, to achieve operation of the current collector system at higher temperatures, higher velocities and higher current densities than is possible with conventional systems. Low friction and low wear rates are in part achieved by operating the contact members in a low temperature environment.

10 Claims, 8 Drawing Figures

SOLID BRUSH CURRENT COLLECTION SYSTEM

CROSS REFERENCE TO RELATED APPLICATION

This application is a continuation-in-part of application Ser. No. 838,181 filed Sept. 30, 1977 now abandoned.

BACKGROUND OF THE INVENTION

The invention described herein relates to an improved system for collecting and transferring electrical current between relatively moving parts, as in a dynamoelectric machine.

The use of solid brushes for collecting or transferring current in systems involving relatively moving parts, such as motors or generators, has been proven reliable and reasonably efficient for many commercial and industrial applications. With the advent of the more recently advanced electrical machinery designs, particularly those involving superconducting excitation coils and high power rated homopolar machines, the need has arisen for improved systems capable of more efficiently collecting and transferring machine current. This need is primarily due to the much greater electrical currents and speeds required to generate more power or transmit more torque than was previously possible.

Present designs of solid brush current collectors operating with sliprings or commutator systems adequately handle current densities of about 10 amperes per square centimeter and brush lifetimes of 0.5–2 years are typical. These current densities apply to machines operating in ambient air and at conventional speeds but it is well known that brush lifetimes can be quadrupled by operating carbon brushes at current densities of about 10 amperes/cm$^2$ in an inert gas atmosphere, such as the hydrogen environment utilized in large synchronous condensers.

Although the actual mechanisms or phenomena associated with current transfer across sliding surfaces are incompletely understood, it is known that the interface resistance (electrical base) and friction (mechanical base) between a slipring or a commutator bar and brushes and wear rates between the contacting members, are grossly affected by the type and reactivity of the gaseous atmosphere in which they operate, the temperature at which the contact members operate, particularly at the interface, and the properties of the contacting materials.

Concerning operation in a gaseous atmosphere, it is known that an unavoidable metal oxide film is deposited on collector surfaces during brush operation in atmospheric air. These brittle oxide films are semiconducting at best, and are physically hard and abrasive when disrupted during normal sliding operations. Because of this, they lead to relatively high unstable contact voltage drops and prevent achievement of optimum low brush friction and wear.

The deposition of such films on the collector surfaces can be minimized by operating the system in an inert gas atmosphere, rather than air. These oxygen-free environments which include carbon dioxide, sulfur hexafluoride and hydrogen, are effective in extending the carbon brush lifetimes and in lowering the contact voltage drops since the insulating and abrasively-hard tarnish films are avoided. However, the demand now exists for high current density brushes and the above gas environments were known to produce good results only at prevailing current densities, i.e. about 10 amperes per square centimeter. Also with regard to the environmental factor, the pressure and composition of ambient gases, including additives such as water vapor, contribute to the reduction of brush friction and wear. High friction and very high wear (dusting) occur when sliding contact pairs operate in vacuum or in dry gas ambients, such as at high altitudes.

The temperature at the brush-slipring interface also directly affects brush life since dusting will occur at predetermined temperatures for different carbon brush materials. It appears that desorption of moisture from the contacting surfaces becomes excessive as the critical temperature is reached for each humidity condition, and this condition must be eliminated for high current density applications.

It is therefore apparent that the need exists for an improved current collection system which will operate for greater lifetimes while simultaneously transferring current through the brushes in a magnitude 10 to 15 times greater than that possible in present designs.

SUMMARY OF THE INVENTION

Briefly stated, the above disadvantages and inadequacies of present current collecting and transfer systems are eliminated in accordance with this invention by providing a new solid brush type current collection system which selectively uses compatible materials in different applications for the moving and stationary contact members. The materials are chosen with regard to whether the application requires commutation as in heteropolar machines or merely transfers current as in homopolar machines. These contact members are operated in an atmospheric environment which utilizes non-oxidizing gases, such as carbon dioxide, having either water or organic additives, such as alcohols, hydrocarbons, ketones, and the like, for the purpose of operating the collector system at higher temperatures, higher current densities, and higher velocities than is possible with conventional systems. To transfer current in an arcless manner, the solid brush collector system undergoes forced contact cooling to maintain the temperature at the contacting members interface at relatively low values to thus achieve low friction and low wear rates of the sliding contact members.

BRIEF DESCRIPTION OF THE DRAWINGS

The subject matter of this invention is particularly pointed out and distinctly claimed in the concluding portion of this specification. The invention, however, both as to organization and method of operation, together with further objects and advantages thereof, may best be understood by reference to the following description taken in connection with the accompanying drawings in which:

DESCRIPTION OF THE PREFERRED EMBODIMENT

Figure 1:
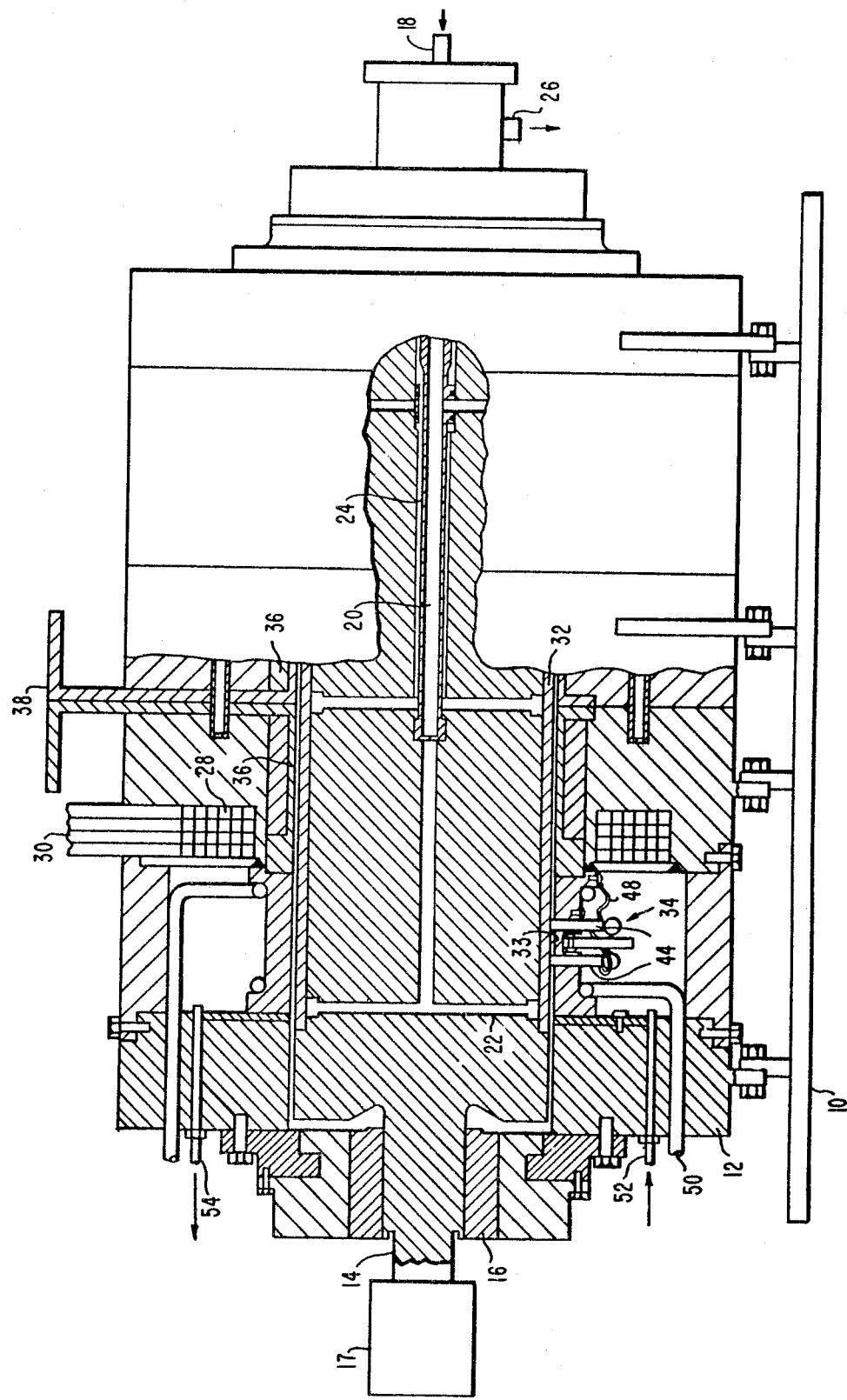
FIG. 1 is a view in elevation, partly in section, generally illustrating a dynamoelectric machine having the advanced current collecting system of this invention.
Figure 2:
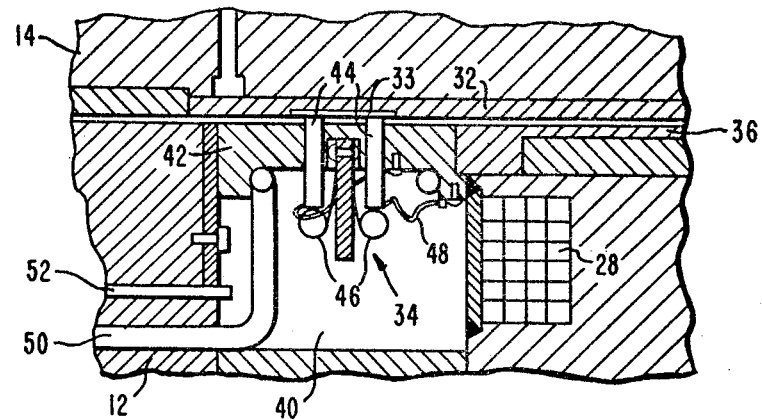
FIG. 2 is an enlarged view of the current collecting system of FIG. 1.

Referring now to the drawings wherein like reference characters designate like or corresponding parts throughout the several views, there is shown in FIGS. 1 and 2, a homopolar generator of advanced design having a base 10 which supports stator 12 and a rotor 14 arranged for electrodynamic cooperation therewith. Although the invention is useful with any kind of dynamoelectric machine, the machine components and construction not bearing directly on the invention are only generally illustrated. The rotor 14 is supported on bearings 16 located on opposite ends of the machine and a coupler 17 is used for connecting the rotor to prime mover, such as a motor. To provide for proper cooling, the rotor is equipped with an inlet 18 which supplies a low temperature coolant through a central passageway 20 and radially through ducts 22 prior to returning through discharge passages to the space 24 and outlet 26.

The stator contains a pair of field coils 28 (only one shown) which are energized through appropriate conductors and are cooled through coolant supply and discharge tubes 30. Current generated by the machine during operation is supplied through a conductor sleeve 32, circumferentially disposed on the rotor, to a commutator or sliprings 33 and current collecting apparatus 34 mounted in opposite ends of the stator. The collector brushes 44 are connected to cylindrical conductors 36 mounted on the stator inner surface which supply current to a load through terminals 38.

Referring to FIG. 2 which shows the current collectors in greater detail, a circumferentially disposed cavity 40 is formed in the stator core 12 which is closed at the air gap by an insulated brush holder 42. The brush holder is appropriately bored or milled to provide openings which house brushes 44 and each brush is urged into contact with the rotor sliprings 33 by constant tension springs 46. The brush shunts 48 are bolted or otherwise secured to the stator conductor 36 in the usual manner. In order to properly cool the brush holders located on both ends of the machine, separate coolant supply pipes 50 extend through opposite ends of the stator into cavity 40. These pipes are either embedded in or secured to the brush holder surface and extend circumferentially therearound before leaving the brush holder cavity on the other side of the machine.

Since machine efficiency requires that the brushes operate at a temperature level where dusting and substantial arcing will not occur, it is necessary to provide a heat sink for the brushes to permit transfer of heat therefrom by conduction. To accomplish this, the brushholders supporting the brushes facilitate the exchange of heat between the brush holders and a coolant which flows through the cooling fluid inlet 52 and outlet 54 supported by the stator. Preferably, the brush holder contains internal circuitous passageways which lie adjacent or close to the brushes in contact with the commutator or slipring surfaces.

Figure 3:
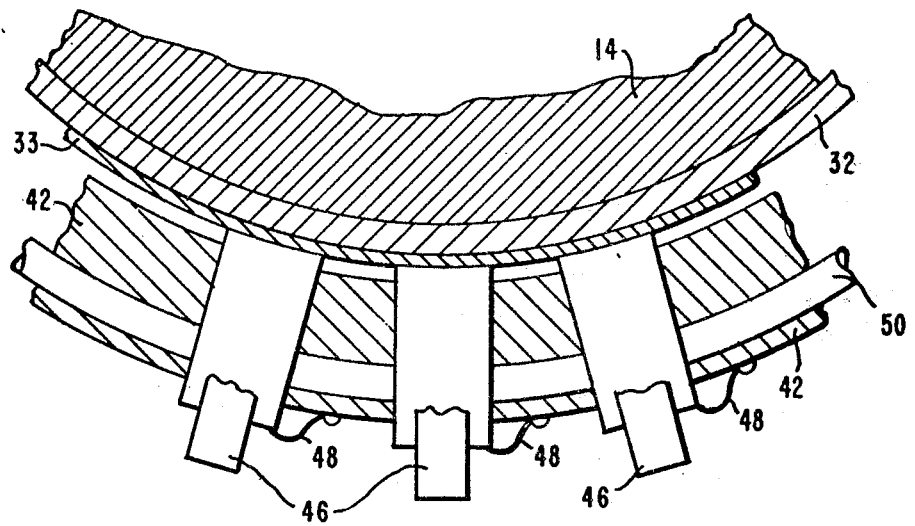
FIG. 3 illustrates the arrangement used to effect cooling of brushes by transferring heat by conduction from a brush holder to a heat exchanger on the brush holder surface.

In the alternative arrangement shown in FIG. 3, the brush holder 42 is supported relative to slipring 33 in the manner of FIG. 1, but additionally, a circular or rectangular pipe 50 is welded or otherwise affixed to the brush holder surface.

As indicated above, the making of this invention has been prompted by the recent design changes made in dynamoelectric machines, particular homopolar generators, which require brushes capable of continuous operation at current densities of 155 amperes per square centimeter and higher, at higher sliding velocities and at substantially decreased wear rates. These desirable performance characteristics are achieved by minimizing the brush-slipring interface resistance which appears as electrical losses, by minimizing the friction between the brush and slipring which appears as mechanical losses, and by minimizing the brush wear rates. To accomplish reduction in the electrical and mechanical losses, and in wear rates, specific combinations of materials are selected for particular applications, the operating environment is changed from present practices and the contact members are positively cooled.

Figure 4:
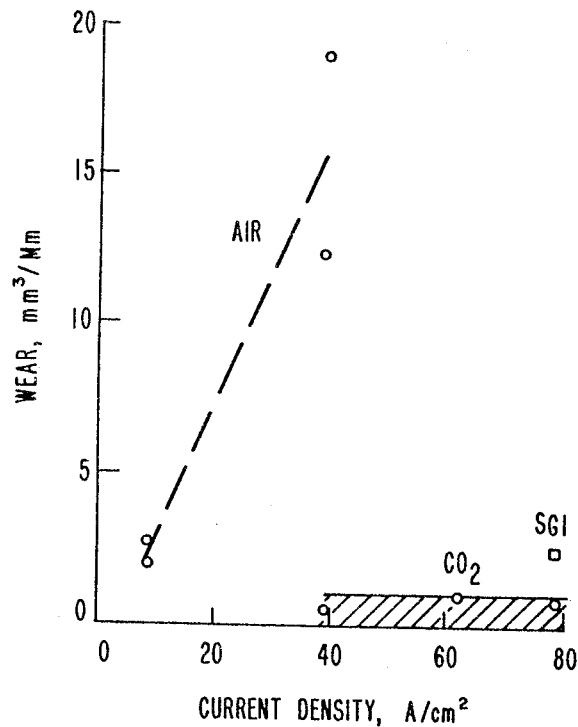
FIG. 4 includes curves which show electrographite brush volume wear in air and carbon dioxide.

Considering the combination of materials, preliminary brush-slipring test data showed that when metal was added to the graphite brush matrix, substantial reduction in the electrical component of the total energy loss was made possible. Confirmation of this effect is shown in the following Table I, and by the curves of FIG. 4.

TABLE I

BRUSH-RING TEST DATA
Cu Ring, 13 meters/second
Moisture Additive
Single Brush Area: 1 $cm^2$
Loads: 7 $newtons/cm^2$; 78 $amperes/cm^2$

| Brush Grade | Gas Ambient | Fric. Coef., $\mu$ | Contact Drop, V | Energy Loss $J/(cm^2 \cdot m)$ | | | Brush Wear, $mm^3/Mm$ |
|---|---|---|---|---|---|---|---|
| | | | | Mech. | Elec. | Total | |
| *EG1 | Air | 0.17 | 0.66 | 0.34 | 0.48 | 0.82 | 2.32 |
| **EG1 | Air | 0.05 | 0.78 | 0.35 | 2.38 | 2.73 | 12.28 |
| EG1 | $CO_2$ | 0.05 | 0.41 | 0.35 | 2.50 | 2.85 | 0.81 |
| SG1 | $CO_2$ | 0.23 | 0.00 | 1.59 | 0.00 | 1.59 | 2.45 |

*Loads: 2 $N/cm^2$, 9 $A/cm^2$
**Load: 39 $A/cm^2$

These results show that silver-graphite grade SG1 brushes which contain 80% silver by weight display an electrical contact loss of substantially zero but at the expense of increased mechanical loss. The total energy loss however was desirably reduced to 56% of that for the EG brushes, both grades operating under the same load conditions and in carbon dioxide. Although the total contact energy loss was reduced with SG1 brush, the brush wear rate was much higher. Relative to conventional operation of EG brushes in air, however, essentially equal life was obtained when the SG brushes were operated in a carbon dioxide environment, even with eight times higher current density. Moreover, the SG brushes show a five fold advantage in life over the EG brushes when load current of the latter is increased to half that of the former. Comparing only EG brushes, with these same differences in current loading, an advantage in life of fifteen fold was achieved when operation was in carbon dioxide rather than in air.

These results show that silver graphite grade SG 1 brushes which contain 80% silver by weight display an electrical contact loss of substantially zero but at the expense of increased mechanical loss. The total energy loss however was desirably reduced to 56% of that for the EG brushes.

The results produced by operation of the above brushes showed the desirability of determining the performance characteristics of multiple brushes, as indicated in the following Table. Therefore, twenty-four commercially available metal-graphite brush grade materials were tested. Many of the chosen materials are frequently incorporated in brushes utilized in industrial and commercial applications and have proven performance ability at conventional current densities in air operation. The brush materials included copper or silver as the main metallic addition. They were formulated by the powder metallurgy compaction/sinter technique and they represent a range in metal content from 60 to 97 w/o (percent metal by weight).

| Brush Grade | Approx. % Metal | Brush Grade | Approx. % Metal | Brush Grade | Approx. % Metal |
|---|---|---|---|---|---|
| W759 | 60 | ME1540 | 80 | SG510 | 90 |
| SG156 | 64 | SG520 | 80 | SG201 | 90 |
| 5004 | 65 | SG216 | 80 | W933 | 92 |
| *CM3B | 74 | SM551 | 80 | M91X | 92 |
| SG212 | 75 | W795 | 85 | **CO157 | 93 |
| SG142 | 75 | SG515 | 85 | *CMO | 95 |
| **ANK | 75 | SG202 | 85 | W405 | 97 |
| ME1541 | 76 | *CM15 | 90 | 728 | 97 |

*Morganite Carbon Co.
**National Carbon Co.
Others - Stackpole Co.

The brushes were evaluated in combination with copper alloy sliprings in a humidified (20° C. dew point) carbon dioxide gas atmosphere, with operating conditions of 78 amperes per square centimeter through the brush which is equivalent to ten times the conventional brush current density. The brushes were exposed to a mechanical load of 7-8 N/cm$^2$ (newtons/square centimeter), and 13-25 m/s (meters/second) ring speed. The contact energy loss and brush wear responses for these brushes are plotted as functions of brush metal content in FIGS. 5 and 6. Although some asymmetry was found in the contact performance between opposite polarity brushes, the average loss and wear values for both are shown in these figures. Many of the points represent averages of a number of duplicate runs, and scatter in the data is believed caused by different graphite base materials and different brush manufacturing processes.

Figure 5:
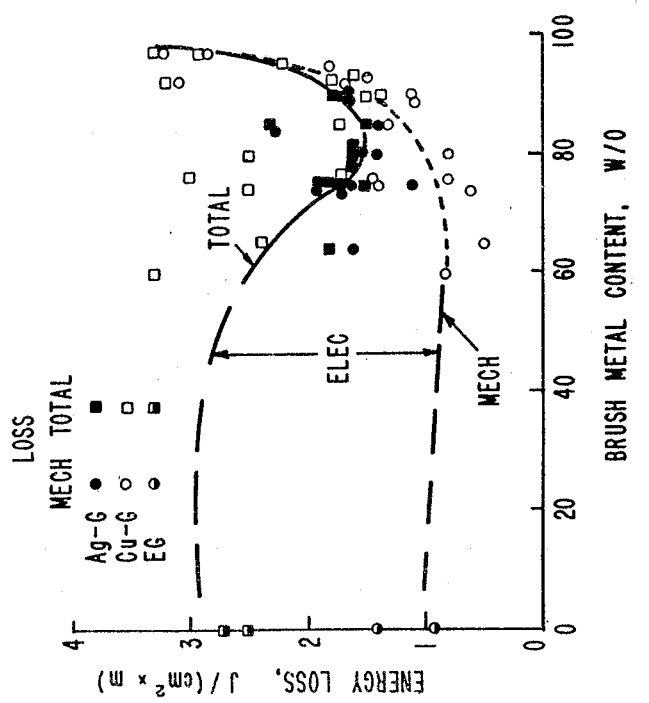
FIG. 5 includes curves which show average brush ring mechanical and electrical energy losses.

It will be noted that the upper curve shown in FIG. 5 indicates that the total contact energy loss (energy density per unit slide distance) is minimal when the brush metal content is near 80 w/o. The curve also shows that the total loss is dominated by the electrical component when the metal content is less than about 70 w/o, but by the mechanical component at larger percentages. This evidence clearly points up the need for efficient use of metal in the brush material. Sufficient metal must be employed to achieve high conductivity, but a large amount of graphite is required to achieve low friction or good lubrication. The performance of certain copper- and silver-graphite brush grades of comparable metal content is shown to be similar thus suggesting that economies can be realized with additions of copper rather than silver. In general, however, the copper-graphite brush grades perform with lower mechanical loss, i.e., lower friction coefficient, than the silver-graphite grades, but with higher electrical, i.e., higher contact drop, and total energy losses.

Figure 6:
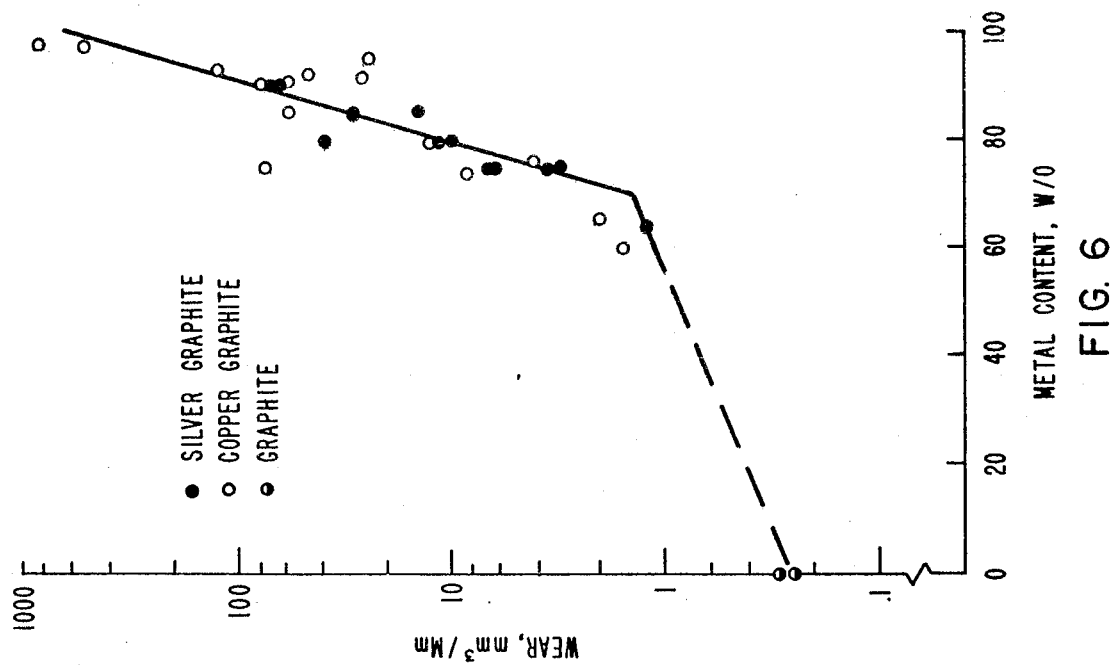
FIG. 6 illustrates curves which show brush wear characteristics for silver-graphite, copper-graphite and graphite brushes.

FIG. 6 illustrates that brush wear which is volume wear per unit slide distance, is very low for small additions of metal. In the range up to 65 w/o, wear increases from 0.5 mm$^3$/Mm with no metal to about 1 mm$^3$/Mm (cubic millimeters per megameter). At higher metal percentages brushwear increases sharply, being 3 mm$^3$/Mm at 75 w/o and 30 mm$^3$/Mm at 85 w/o.

Concerning the effect of temperature on brushwear, it is known that electrographitic brushes will experience very high brushwear in the form of dusting if the brushes are run at too high temperatures. The critical brush bulk temperatures, i.e., the temperatures inside the brush, for electrographitic brushes range between 180° and 220° C. when running in carbon dioxide environments humidified at levels of 0° and 20° C. dew point, respectively. On the other hand, brush life is very long if the brush temperature is maintained below these critical levels. It is believed that the reason for dusting is that desorption of moisture from the contact counterface graphite sites becomes excessive as the critical temperature is reached for each humidity condition. There are unsatisfied surface energies which result in excessive adhesion forces between the contact members thus causing increased friction and high wear. It therefore is clear that for high current density applications, adequate cooling of the sliding brush contacts is essential and the design illustrated in FIGS. 1-3 is intended to perform this cooling function.

To properly assess the influence of slipring or commutator materials on the current transfer system, nineteen different slipring materials were evaluated in combination with copper-graphite brushes. The ring materials included copper, silver, high strength-high conductivity copper alloys, graphite, nickel, nickel alloys, high zinc brass, and steels. The following Table summarizes the operating conditions and test performance results for each of the slipring materials evaluated:

TABLE II

PERFORMANCE OF SELECTED SLIPRING MATERIALS
Evaluation Test Conditions

| Single Brush Area 1 cm$^2$ | Carbon Dioxide Atmosphere |
| Two Brushes per Set | Moisture Additive (20° C. dew point) |
| Current Density 78 A/cm$^2$ | Ring Velocity 15 m/s |
| Load Pressure 8 N/cm$^2$ | Copper-Graphite Brushes |

| Slipring Material | Single Brush Drop, $V_1$ | Friction Coef., $\mu$ | Energy Loss Density, J/cm$^2$ · m | Brush Holder Temp., °C. | Brush Wear, mm$^3$/Mm |
|---|---|---|---|---|---|
| Grade C Steel | 0.74 | 0.14 | 4.86 | 157 | 1.72 |
| K Monel-S | 0.82 | 0.09 | 4.82 | 169 | <0.15 |
| 316 S/Steel | 0.74 | 0.10 | 4.50 | 165 | 20.97 |
| 35 Zn Brass | 0.58 | 0.11 | 3.81 | 123 | 2.29 |
| 45 Ni/55 Cu | 0.54 | 0.08 | 3.34 | 136 | 0.55 |
| 30 Ni/70 Cu | 0.53 | 0.08 | 3.31 | 136 | 0.59 |
| #3 Tool Steel | 0.39 | 0.15 | 3.15 | 119 | 13.20 |
| Monel | 0.49 | 0.07 | 3.00 | 127 | 0.99 |
| Nickel | 0.38 | 0.10 | 2.73 | 108 | 0.25 |
| Graphite | 0.26 | 0.13 | 2.36 | 96 | 0.10 |
| Ag Plated Cu | 0.14 | 0.18 | 2.17 | 97 | 0.20 |
| Zr Cu | 0.07 | 0.21 | 2.05 | 92 | 0.20 |
| 15 Ni/85 Cu | 0.12 | 0.17 | 2.00 | 90 | 0.40 |
| Cu (Ag Bearing) | 0.10 | 0.19 | 2.00 | 85 | <0.15 |
| 8 Sn/4 Zn/Cu | 0.07 | 0.20 | 1.98 | 93 | 0.20 |
| Cupaloy | 0.11 | 0.17 | 1.97 | 88 | 0.20 |
| OFHC Cu | 0.07 | 0.19 | 1.91 | 92 | 0.30 |
| PD 135 Cu | 0.06 | 0.19 | 1.85 | 90 | <0.15 |
| KR Monel | 0.13 | 0.15 | 1.82 | 92 | 0.25 |

Generally, the test results show that the lowest net power loss and longest life were achieved when the copper containing graphite test brushes were run on copper, super-strength copper alloys, and silver surfaced collector rings. Although lower friction coefficients accompany operation on nickel, high nickel-containing, and steel metal rings, the associated higher contact resistances (voltage drops) result in relatively high total energy losses. It will be noted that KR Monel appears to be an exception, combining low contact drop with medium friction to yield low energy loss and low brush wear. Wear of the brushes was significantly increased when they were combined with steel and high zinc brass metal rings.

A number of conclusions can be reached from the evaluations made of both brushes and sliprings in a current transfer system.

1. The present state-of-the-art practice of 10 amperes per square centimeter brush current density is extendible to at least eight times if brushes are operated in a humidified $CO_2$ gas environment.
2. Based on evaluation test conditions, at least 15 times longer brush life was obtained by operating electro-graphitic brushes in a $CO_2$ environment as compared to air, even with eight times the conventional current density.
3. Total contact energy loss is substantially reduced (44%) through the introduction of silver to a graphite brush matrix. Equal life was obtained with silver-graphite brushes operating in a $CO_2$ environment compared to conventional electrographitic brushes operating in air, even with eight times the conventional current density.
4. Based on the evaluations made, commercially available graphite brushes containing 65 to 75 w/o silver represent the optimum combination of brush materials for continuous operation in high current density machines.
5. The slipring materials evaluations show that high strength-high conductivity copper alloys are considered the best candidates for the desired high current contact systems. Copper-graphite brushes combined with rings of this type yielded lower energy loss and lower wear characteristics than when combined with ring materials such as nickel, high zinc brass, and steel.

It is believed important to note that the film on the slipring contributes importantly to the very low wear character of electro-graphitic brushes in carbon dioxide environments. The copper slipring initially is cleaned and a very light graphite film is deposited on the slipring by the brushes during the first few rotations of the slipring. The film is difficult to detect visually and it does not perceptively change thereafter. Electrical conduction across the brush-slipring interface is limited essentially by the brush constriction resistance which varies directly with the resistivity. Since only minute wear occurred during the performance runs made, it is conjectured that solid-to-solid touching of the brush ring contact is prevented by adsorbed vapor and/or gas films. Graphite transferred to the slipring and graphite in the brush face serve as high affinity adsorption sites for the ambient gas vapors. Thus, brush sliding occurs on very thin quasi-fluid films. Friction drag occurs as these films are sheared or as graphite crystallites are made to slip upon one another as relative motion between the ring and the brushes takes place.

In addition to brush and slipring materials, five different non-oxidizing gas atmospheres, including sulphur hexafluoride, on brush performance were evaluated. These included two silver graphite brushes in combination with a copper slipring which were operated under similar conditions in each of the gases. Similar brushes were also operated in air to provide the oxidizing gas comparison. Laboratory grade gases were used for the experiments, each with dew points less than −68° C. prior to receiving deliberate additions of moisture (0° C. dew point) just before entering the brush ring test enclosure. The results are shown in the following Table III. It is to be noted that desired brush performances are characterized by low energy loss and low brush wear. The net effect of electrical loss (contact voltage drop) and mechanical loss (friction coefficient) per unit distance travelled is reflected in the energy loss characteristics shown.

TABLE III

EFFECTS OF ENVIRONMENT GAS

SG 2 Grade Brushes (1 cm$^2$/brush), Copper Ring (13 m/s)
Brush Loads: 78 A/cm$^2$, 8 N/cm$^2$
Brush Bulk Temperature Range: 67°–80° C.

| Gas* | Contact Drop, V | Friction Coef., $\mu$ | Energy Loss, J/cm$^2$ . m | Brush Wear, mm$^3$/Mm |
|---|---|---|---|---|
| Air | | | | |
| Air | .00 | .34 | 2.3 | 23.3 |
| CO$_2$ | .03 | .18 | 1.6 | 3.2 |
| SF$_6$ | .18 | .10 | 1.9 | 2.2 |
| N$_2$ | .17 | .06 | 1.6 | 1.5 |
| He | .26 | .06 | 2.1 | 1.3 |
| Ar | .17 | .06 | 1.5 | 0.7 |

*Approx. 1 atmosphere total pressure.
Moisture additive partial pressure 600 Pa.

Brush performance, in terms of desired low energy loss and low wear, is significantly better in each of the five wetted non-oxidizing gas environments than in air. A very low friction coefficient (0.06), lowest energy loss [1.5 J/cm$^2$.m (joules per square centimeter times meters)], and lowest wear (0.7 mm$^3$/Mm) were measured when the test brushes were run in an argon gas environment. Brush contact drop was very low (0.03 V) in the carbon dioxide gas environment, but it was six to nine times higher in the other gases. The low contact voltage achieved with carbon dioxide, however, is offset by a higher coefficient of friction (0.18) and higher brush wear (3.2 mm$^3$/Mm).

Dynamic brush performance evaluations were made on five different hydrocarbon vapor additives as examples to support the interface model, in terms of their effect on the contact drop (resistance) and wear performance of silver-graphite brushes operating on a copper slipring in a "bone dry" carbon dioxide gas atmosphere.

Organic vapors include members of the alkane, alcohol, ketone, aldehyde and cycloparaffinic classes of materials selected from paraffinic (alkane) hydrocarbons having from 7 to 16 carbon atoms per molecule, such as, for example, heptane $C_7H_{16}$, dodecane $C_{12}H_{26}$, hexadecane $C_{16}H_{34}$ and the like; alcohols having from 7 to 16 carbons, such as for example, heptanol $C_7H_{15}OH$, decanol $C_{10}H_{21}OH$ and the like: ketones having from 7 to 16 carbons, such as, for example, 2-heptanone (amyl-methyl ketone) $CH_3CO(CH_2)_4CH_3$, 2-decanone (methyl-octyl ketone) $CH_3COC_8H_{17}$ and the like; aldehydes having from 7 to 16 carbons, such as, for example, n-heptaldehyde (enanthaldehyde) $CH_3(CH_2)_5CHO$, n- decylaldehyde (capraldehyde) $CH_3(CH_2)_8CHO$ and the like; and the cycloparaffinic compound decalin (decahydro naphthalene) $C_{10}H_{18}$, and mixtures thereof. While these materials contain many isomers, the straight chain, normal (n-) single carbon-carbon bond forms is preferred because they are thought to attach better to the graphite materials having less than 7 or more than 16 carbons present problems of addition. The most preferred materials are n-paraffinic hydrocarbons having from 7 to 16 carbons.

Figure 7:
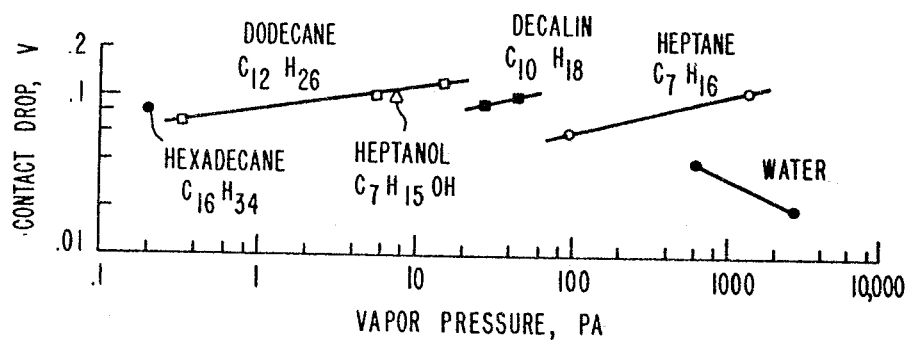
FIG. 7 includes curves which show the effect of vapor additives on brush voltage drop.
Figure 8:
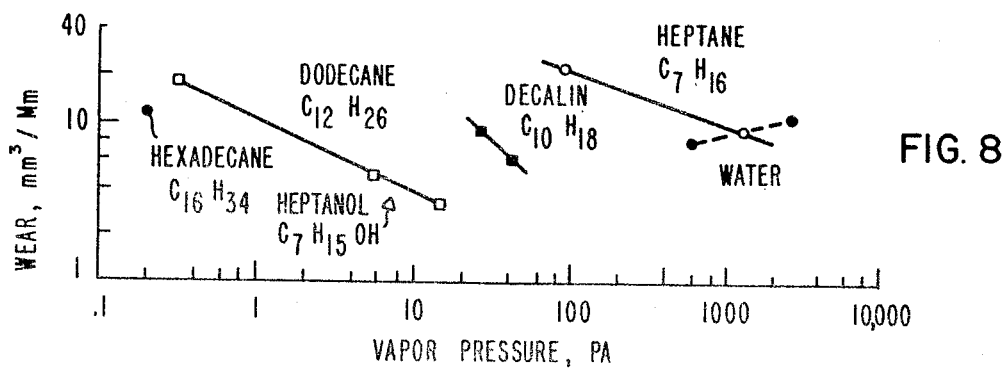
FIG. 8 includes curves which show the effect of vapor additives on brush wear.

Water vapor is also included for reference purposes. All of the additive hydrocarbons are liquid at room temperature. Vapors were introduced into the continuously supplied test gas ($CO_2$) by bubbling it through the additive, held at either 0° or 25° C. Other vapor concentrations were obtained by blending portions of wetted and dry streams of the test gas. The total ambient gas pressure was maintained near one atmosphere. The operating conditions, the test vapor additives, and the brush-ring performance characteristics are shown in FIGS. 7 and 8. These tests were run in a $CO_2$ environment at about 1 atmosphere total pressure, using 1 $cm^2$ silver-graphite brushes and 13 m/s copper rings. The brush loads were 78 $A/cm^2$ and 8 $N/cm^2$ and the brush temperature range was 65°–78° C.

It is evident from FIG. 7 that a significantly higher brush contact voltage prevails when hydrocarbon vapor additives are substituted for water vapor in $CO_2$ atmospheres. This is so even for very low partial pressures of the hydrocarbon additive vapors. The brush voltage magnitude tends to be relatively constant for all of the hydrocarbons and over very wide ranges of vapor concentrations. There is, however, a modest increasing voltage characteristic noted with increasing vapor pressure.

Non-dusting wear was achieved through separate additions of each of the hydrocarbon vapors to pure dry $CO_2$ atmospheres in which high current silver-graphite brushes were operated, FIG. 8. Moreover, brush wear may be reduced by increasing the hydrocarbon additives' vapor pressure in the range investigated. A given brush life is also achievable with lower vapor concentrations as the hydrocarbon molecular weight is increased. For example, equal brush life is indicated for 670 and 0.2 Pa vapor pressures of heptane and hexadecane, respectively. A much higher concentration of water vapor, 3000 Pa, is required to achieve the same brush life. Although not shown, the brush-ring friction coefficient remained essentially constant (0.16) regardless of the vapor additive or its concentration pressure.

Those tests show that a substantial improvement in brush performance (lower interface energy loss and lower wear) was found when operation was in each of five selected gases ($CO_2$, $SF_6$, $N_2$, He and A) as compared to similar operation in air. All test gas environments contained water vapor at a partial pressure of 600 Pa. The best performance exhibited by silver-graphite brushes operating at 78 $A/cm^2$ current density was obtained in an argon environment.

Five different hydrocarbons were tested as vapor additions to an otherwise dry carbon dioxide gas atmosphere. These were found to be equally as effective as moisture in providing lubrication and low wear. Brush performance in these environments was found to be dependent on the hydrocarbon molecular weight (chain length) and upon the vapor concentration. Relative to moisture additions, equal brush life is achieved with very low concentrations of the hydrocarbon materials selected. Contact voltage drop can be affected by varying the partial pressure of the hydrocarbon additive.

It will be apparent that many modifications and variations are possible in light of the above teachings. The specific materials used for the contact members, both stationary and rotating, will obviously need to be selected for each particular application where tradeoffs in regard to contact resistance, friction and wear rates, can be made. It will occur to those skilled in the art that different materials' combinations may be suitable depending on whether the application requires commutation, for example, heteropolar machines which use commutators or segmented rings; or merely transfers current, as for example in homopolar machines which generally use continuous collector rings. As indicated in this disclosure, typical combinations include electrographitic carbon brushes on copper commutators, silver- or copper-graphite brushes on copper alloy or steel sliprings, or carbon brushes on copper sliprings. The stationary and rotating material members are, of course, operated in an oxygen-free gas environment into which is incorporated a suitable vapor additive. Also, the cavity housing the brush holders and adjacent current collectors may be located in a portion of the stator as disclosed herein, or axially outwardly therefrom, as in direct current machines. It therefore is to be understood that within the scope of the appended claims, the invention may be practiced other than as specifically described.

What is claimed is:

1. A solid brush current collecting system comprising:
    a dynamoelectric machine having a stator and a rotor supported therein and arranged for electrodynamic cooperation therewith;
    at least one current collector on said rotor which collects current during machine operation;
    solid current collecting brushes mounted in brush holders on said machine, said brush holders being positioned to permit brush contact with said current collector;
    means enclosing said current collector and brushes in a fluid-tight cavity closed to the atmosphere;
    means for circulating a pressurized non-oxidizing gas through said cavity;
    said gas having an additive mixed therewith, said additive comprising a vaporous organic substance selected from the group consisting of paraffinic hydrocarbons having from 7 to 16 carbons, alcohols having from 7 to 16 carbons, ketones having from 7 to 16 carbons, aldehydes having from 7 to 16 carbons, decalin, and mixtures thereof.

2. The system according to claim 1 wherein the brushes are graphitic type brushes having metal dispersed therein which ranges in content from 30 to 97 percent by weight.

3. The system according to claim 2 where the brushes defined therein have a wear rate which ranges between 3 and 30 $mm^3/Mm$ when the metal content in the brush ranges between about 75 and 85 w/o.

4. The system according to claim 1 wherein the gas circulated through said housing comprises carbon dioxide.

5. The system according to claim 1 wherein the rotor and each of said brush holders contain internal passages;
    means adapted for connection to a source of coolant supply connected to said passages and arranged to circulate a coolant therethrough for carrying away heat generated during machine operation.

6. The system according to claim 1 wherein each of said brush holders has a cooling pipe placed in heat exchange relationship therewith for carrying away generated heat.

7. The system according to claim 1, wherein said vaporous organic substance is a paraffinic hydrocarbon having from 7 to 16 carbons.

8. The system according to claim 1, wherein said vaporous organic substance is a n-paraffinic hydrocarbon having from 7 to 16 carbons.

9. A solid brush current collecting system comprising:
- a dynamoelectric machine having a stator and a rotor supported therein and arranged for electrodynamic cooperation therewith;
- at least one current collector on said rotor which collects current during machine operation;
- solid current collecting brushes mounted in brush holders on said machine, said brush holders being positioned to permit brush contact with said current collector, and wherein the brushes are graphitic type brushes having a metal dispersed therein ranging in content from 30 to 97 percent by weight;
- means enclosing said current collector and brushes in a fluid-tight cavity closed to the atmosphere;
- means for circulating a pressurized non-oxidizing gas through said cavity;
- said gas having an additive mixed therewith, said additive comprising a vaporous organic substance selected from the group consisting of paraffinic hydrocarbons having from 7 to 16 carbons, alcohols having from 7 to 16 carbons, ketones having from 7 to 16 carbons, aldehydes having from 7 to 16 carbons, decalin, and mixtures thereof; and
- cooling means for carrying away heat generated by said machine during operation, said cooling means including coolant flow passages in the machine and in said brush holders through which a liquid coolant is circulated.

10. The system according to claim 9 wherein the non-oxidizing gas circulated through the cavity includes a gas containing water vapor and selected from at least one of carbon dioxide, sulphur hexafluoride, nitrogen, helium and argon.

* * * * *